US009485372B2

(12) United States Patent
Tobinaga

(10) Patent No.: US 9,485,372 B2
(45) Date of Patent: Nov. 1, 2016

(54) IMAGE FORMING APPARATUS

(71) Applicant: KYOCERA Document Solutions Inc., Osaka (JP)

(72) Inventor: Masayuki Tobinaga, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/075,594

(22) Filed: Mar. 21, 2016

(65) Prior Publication Data

US 2016/0295031 A1  Oct. 6, 2016

(30) Foreign Application Priority Data

Mar. 31, 2015  (JP) ................... 2015-073510

(51) Int. Cl.
*H04N 1/00* (2006.01)
*G06K 9/00* (2006.01)

(52) U.S. Cl.
CPC ........ *H04N 1/0044* (2013.01); *G06K 9/00355* (2013.01); *H04N 1/00251* (2013.01); *H04N 1/00267* (2013.01); *H04N 1/00411* (2013.01); *H04N 2201/0094* (2013.01)

(58) Field of Classification Search
USPC ....................................... 358/1.15
See application file for complete search history.

(56) References Cited

U.S. PATENT DOCUMENTS

| 7,533,995 | B2 | 5/2009 | Momiuchi et al. |
| 7,766,485 | B2 | 8/2010 | Momiuchi et al. |
| 8,861,022 | B2* | 10/2014 | Hashimoto .......... G06K 15/005 358/1.15 |
| 2004/0135741 | A1* | 7/2004 | Tomisawa .......... H04N 13/0497 345/6 |
| 2005/0068999 | A1* | 3/2005 | Momiuchi ............. G09F 19/18 372/24 |
| 2009/0213340 | A1 | 8/2009 | Momiuchi et al. | |

FOREIGN PATENT DOCUMENTS

| JP | 2007-206588 A | 8/2007 |
| JP | 2010-078623 A | 4/2010 |
| JP | 2013-127625 A | 6/2013 |

OTHER PUBLICATIONS

Uchiyama Taro et al., Aerial Visible Image Formimg Apparatus and Aerial Visible Image Forming Method, Aug. 8, 2007, Japanese Patent Application Publication JP2007-206588 listed on IDS submitted by Applicant, all pages.*

* cited by examiner

*Primary Examiner* — Ngon Nguyen
(74) *Attorney, Agent, or Firm* — IP Business Solutions, LLC

(57) ABSTRACT

An image forming apparatus includes an image forming unit that forms an image on a recording sheet, an image formation control unit that controls an operation of the image forming unit, a visible image forming unit that forms a visible image in air, a display control unit that controls an operation of the visible image forming unit, to cause the visible image forming unit to form a visible image representing a display screen containing a preview of an image to be formed, and a reception unit that receives an operation of a user performed in the air on the display screen formed as visible image by the visible image forming unit. The display control unit eliminates, when the reception unit receives a predetermined operation of the user, an image in an area designated by the predetermined operation of the user from the preview of the image to be formed.

8 Claims, 6 Drawing Sheets

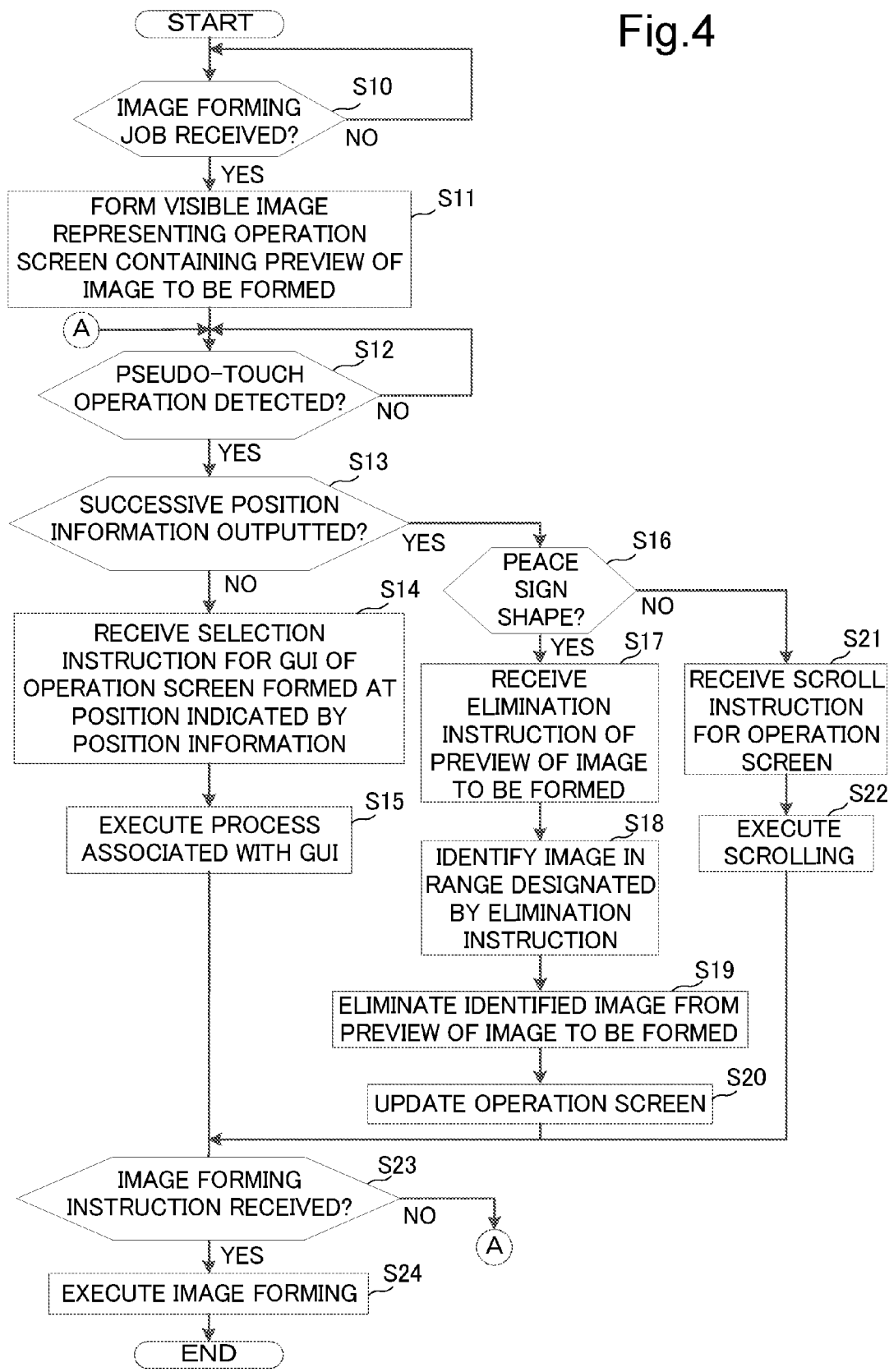

IMAGE FORMING APPARATUS

INCORPORATION BY REFERENCE

This application claims priority to Japanese Patent Application No. 2015-73510 filed on Mar. 31, 2015, the entire contents of which are incorporated by reference herein.

BACKGROUND

The disclosure relates to an image forming apparatus, and more particularly to a technique of displaying a screen presenting contents of an image to be formed.

Normally, image forming apparatuses include a display unit, for example a liquid crystal display (LCD) and an organic light-emitting diode (OLED) display. Such an image forming apparatus displays a screen presenting a preview of the image to be formed (so-called a preview screen) in the display unit, for the user to confirm the contents of the image to be formed. Then the image forming apparatus receives an instruction of the user for editing the preview of the image to be formed through, for example, a touch panel function provided in the display unit, to thereby print the image edited by the user (image forming).

SUMMARY

The disclosure proposes further improvement of the foregoing technique.

In an aspect, the disclosure provides an image forming apparatus including an image forming unit, an image formation control unit, a visible image forming unit, a display control unit, and a reception unit.

The image forming unit is configured to form an image on a recording sheet.

The image formation control unit is configured to control an operation of the image forming unit.

The visible image forming unit is configured to form a visible image in air.

The display control unit is configured to control an operation of the visible image forming unit, so as to cause the visible image forming unit to form a visible image representing a display screen containing a preview of an image to be formed.

The reception unit is configured to receive an operation of a user performed in the air with respect to the display screen formed as visible image by the visible image forming unit.

The display control unit configured to execute an elimination process which eliminates an image in an area designated by the predetermined operation of the user from the preview of the image to be formed when the reception unit receives a predetermined operation of the user.

Further, the image formation control unit causes the image forming unit to form an image which has been subjected to the elimination process by the display control unit.

BRIEF DESCRIPTION OF THE DRAWINGS

FIG. 4 is a flowchart showing an operation flow performed by the image forming apparatus according to the embodiment of the disclosure;

DETAILED DESCRIPTION

Figure 1:
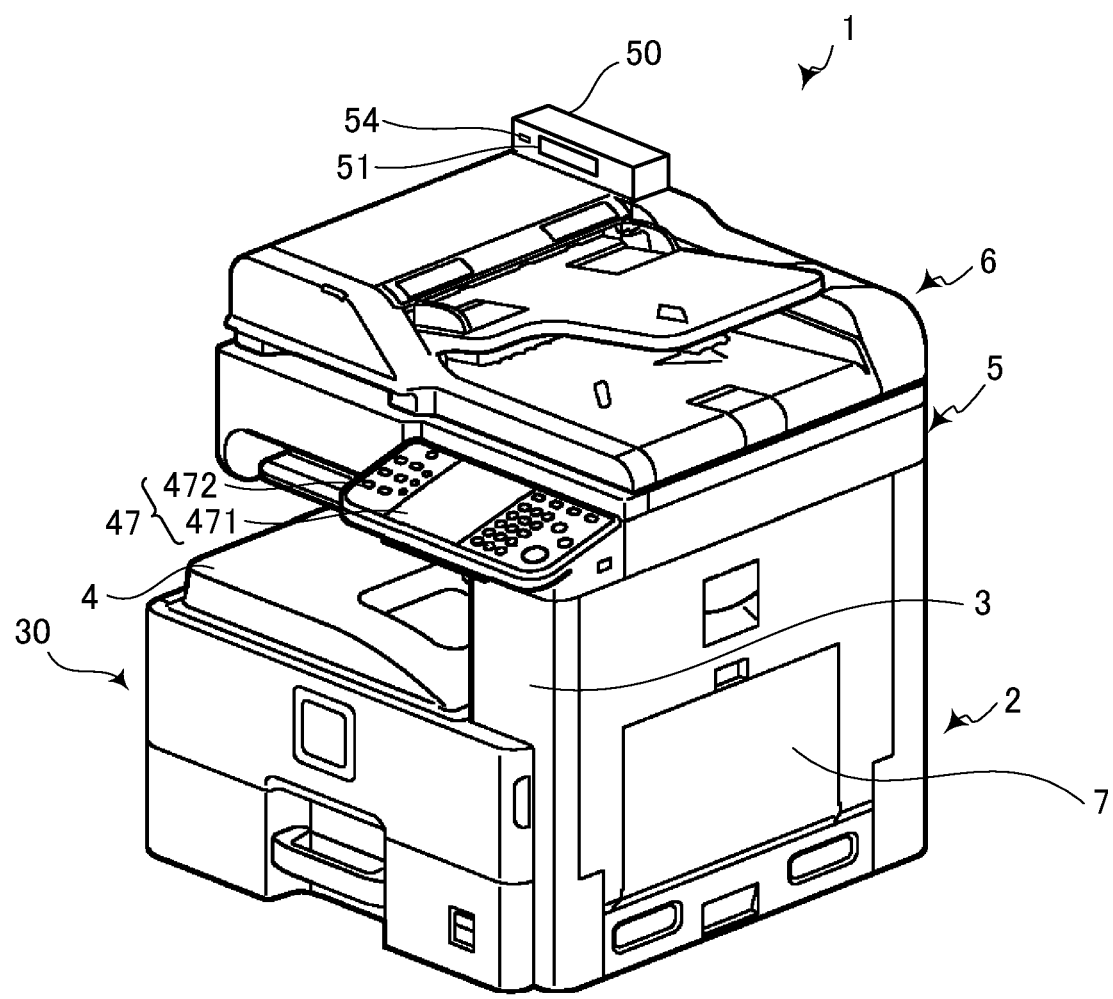
FIG. 1 is a perspective view showing an appearance of an image forming apparatus according to an embodiment of the disclosure.
Figure 2:
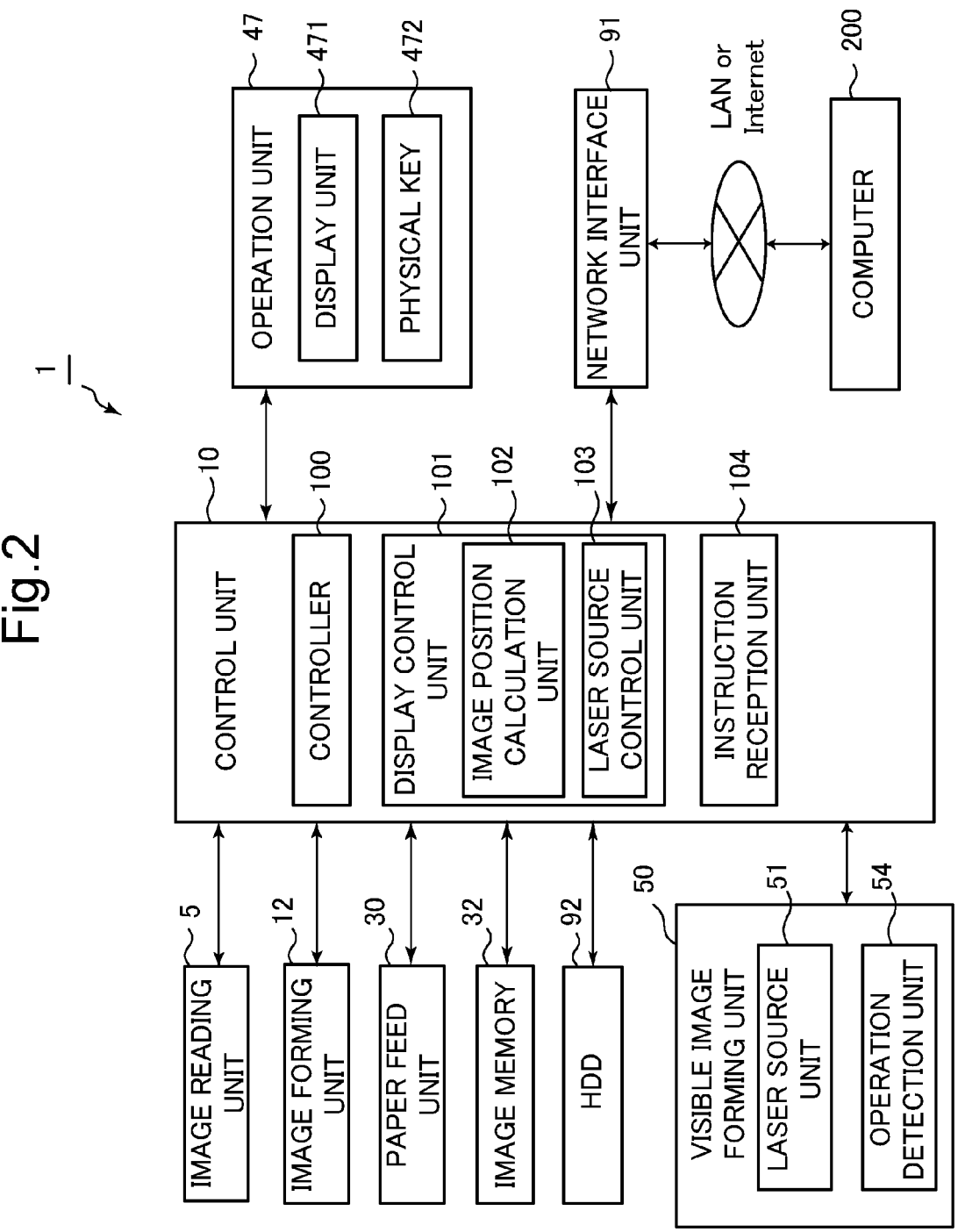
FIG. 2 is a functional block diagram showing an essential internal configuration of the image forming apparatus according to the embodiment of the disclosure.

Hereafter, an image forming apparatus according to an embodiment of the disclosure will be described. FIG. 1 is a perspective view showing an appearance of the image forming apparatus. FIG. 2 is a functional block diagram showing an essential internal configuration of the image forming apparatus.

The image forming apparatus 1 according to the first embodiment of the disclosure is a multifunction peripheral having a plurality of functions, such as facsimile transmission, copying, printing, and scanning. As shown in FIG. 1, the image forming apparatus 1 includes a main body 2, an image reading unit 5 located above the main body 2, and a joint portion 3 provided between the image reading unit 5 and the main body 2.

The casing 7 constituting the outer shell of the image forming apparatus 1 accommodates therein a plurality of components that serve to realize various functions of the image forming apparatus 1. Out of the components shown in FIG. 2, the image reading unit 5, an image forming unit 12, a paper feed unit 30, an image memory 32, a network interface unit 91, a hard disk drive (HDD) 92, and a control unit 10 are provided inside the casing 7.

The image reading unit 5 includes a document feeder 6, and optically reads a source document transported from the document feeder 6 or placed on a non-illustrated contact glass. The image reading unit 5 reads the source documents one by one, thereby acquiring image data representing an image to be formed.

The paper feed unit 30 includes a non-illustrated paper feed cassette and a pickup roller, and feeds the recording sheets placed in the paper feed cassette with the pickup roller, toward the image forming unit 12 one by one.

The image forming unit 12 includes non-illustrated photoconductor drums, charging units, exposure units, developing units, and a transfer unit, and forms (prints) images on the recording sheet delivered from the paper feed unit 30, on the basis of the image read by the image reading unit 5 or print data transmitted from, for example, a personal computer connected to a network. The recording sheet having the image formed thereon undergoes a fixing process performed by a non-illustrated fixing unit, and is discharged to an output tray 4.

The image memory 32 is a region for temporarily storing the image data acquired through the document reading performed by the image reading unit 5, and image data to be formed into an image by the image forming unit 12.

The network interface unit 91 includes a communication module such as a LAN board. The network interface unit 91 transmits and receives data to and from a computer 200 or other devices in the local area, through the LAN connected to the network interface unit 91.

The HDD 92 is a large-capacity storage device for storing, for example, the image data acquired through the document reading performed by the image reading unit 5.

The control unit 10 includes a central processing unit (CPU), a random access memory (RAM), and a read only memory (ROM). The control unit 10 acts as controller 100, display control unit 101, and instruction reception unit 104, when the CPU executes a control program stored in the ROM or HDD 92. The components of the control unit 10 may be respectively realized by hardware circuits, instead of the operation based on the control program.

The controller 100 is connected to the image reading unit 5, the image forming unit 12, the paper feed unit 30, the image memory 32, the network interface unit 91, and the HDD 92, to control those functional units and to transmit and receive data to and from those units. In particular, the controller 100 acts as image formation control unit that controls the image forming operation performed by the image forming unit 12.

The display control unit 101 is configured to control the operation of a display unit 471 and a visible image forming unit 50 to be subsequently described. The display control unit 101 includes an image position calculation unit 102 and a laser source controller 103 employed for controlling the operation of the visible image forming unit 50. Details of the image position calculation unit 102 and the laser source controller 103 will be subsequently described.

The instruction reception unit 104 is configured to receive an operation of a user inputted through an operation unit 47 to be subsequently described, or detected by an operation detection unit 54 to be subsequently described. Here, the instruction reception unit 104 and the operation detection unit 54 exemplify the reception unit in the disclosure.

The image forming apparatus 1 also includes the operation unit 47 including the display unit 471 (display) and physical keys 472, and located on the front face of the casing 7 constituting the outer shell of the image forming apparatus 1.

The display unit 471 is constituted of, for example, an LCD or OLED display, the display surface thereof being oriented upward. The display unit 471 is configured to display, on the display surface, an operation screen (display screen) related to image forming or document reading, under the control of the display control unit 101.

The physical keys 472 include, for example, arrow keys for moving the focus of a graphical user interface (GUI) constituting the operation screen, an enter key for confirming the operation to the GUI constituting the operation screen, and numeric keys. The physical keys 472 serve as operation unit for receiving the operation of the user performed with respect to the operation screen displayed on the display surface of the display unit 471.

The display unit 471 also includes a non-illustrated touch panel provided on the upper face of the display surface. The touch panel may be, for example, of a resistive film type or a static capacitance type. The touch panel detects a contact made by the user on the display surface of the display unit 471, as well as the position where the contact has been made. Upon detecting the contact by the user, the touch panel outputs a detection signal indicating the coordinate position of the contact point, to the instruction reception unit 104. Here, the touch panel includes a type that detects, for example, the user's finger when the user's finger comes within a predetermined distance from the touch panel, though a direct touch to the display surface is not made. Accordingly, the term "contact" referred to in this embodiment will also include the case where the approach of the finger or the like to the predetermined distance from the touch panel is detected, though actually a direct touch to the display surface is not made.

Further, the visible image forming unit 50 is provided on the upper face of the casing 7 constituting the outer shell of the image forming apparatus 1.

The visible image forming unit 50 is configured to form a visible image in the air.

(1) The visible image forming unit 50 intermittently emits an invisible laser beam, and generates plasma by collecting the laser beam with lenses and mirrors, to thereby form, in the air, the visible image representing characters and pictures on the basis of the visible light from the plasma thus generated. Such a visible image forming method can be found, for example, in JP-A-No. 2003-233339 and JP-A-No. 2007-206588.

(2) Alternatively, the visible image forming unit 50 may include an optical image forming device, to receive and reflect light from a display device and converge the reflected light at a symmetrical position of the display device with respect to the optical image forming device, to thereby form an object image in the air. Such a visible image forming method can be found, for example, in JP-A-No. 2013-127625. In this embodiment, it will be assumed that the visible image forming unit 50 is configured as (1) above.

The visible image forming unit 50 includes a laser source unit 51 and the operation detection unit 54. The laser source unit 51 includes, though not shown, a laser source that emits a laser beam, lenses and mirrors that collect the laser beam from the laser source to thereby generate plasma, and a scanning mechanism for scanning over the laser source and the lenses and mirrors. The laser source unit 51 emits an invisible laser beam under the control of the display control unit 101. The laser source unit 51 then generates plasma by collecting the laser beam with lenses and mirrors, to thereby form, in the air, the operation screen containing characters and pictures as visible image, on the basis of the generated plasma.

The image position calculation unit 102 of the display control unit 101 calculates the emission direction and emission position of the laser beam from the laser source unit 51, so as to allow the visible image representing the operation screen to be formed at a predetermined visible image forming position (position on a predetermined three-dimensional coordinate system). In other words, the image position calculation unit 102 calculates the visible image forming position where the laser source unit 51 is to generate the plasma.

The laser source controller 103 of the display control unit 101 controls the laser source unit 51, so as to cause the air present in the emission direction and emission position of the laser beam calculated by the image position calculation unit 102 to perform plasma emission. The visible image is generated by luminescent spots that appear at the intersections of two laser beams, and therefore the laser source controller 103 controls the laser source unit 51 so as to adjust the timing to emit the two laser beams such that, for example, the positions of the luminescent spots correspond to the pixels constituting the image.

Figure 3:
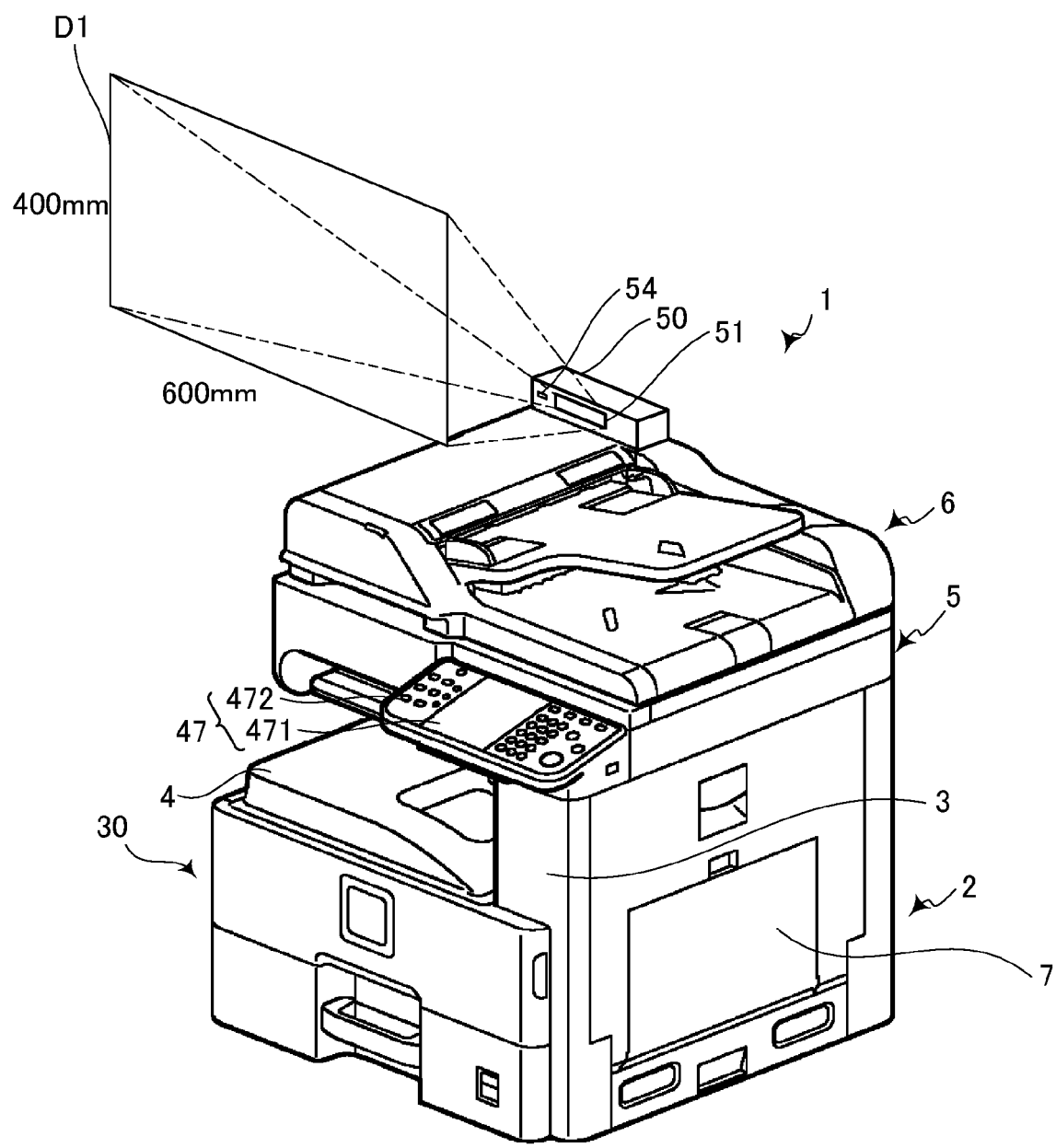
FIG. 3 is a perspective view showing a visible image formed by a visible image forming unit of the image forming apparatus according to the embodiment of the disclosure.

Under such control of the display control unit 101, the visible image forming unit 50 forms a visible image D1 at a predetermined position in the air above the image forming apparatus 1, as shown in FIG. 3. The visible image D1 represents the operation screen (preview screen) containing the preview of the image to be formed by the image forming unit 12, in a size of, for example, 400 mm in height and 600 m in width.

Since the size of the display unit 471 is limited, it is difficult to transmit the information contained in the operation screen of the display unit 471 to a person located distant from the display unit 471. In addition, the display unit 471 having the touch panel function is normally oriented upward in many of the image forming apparatuses as shown in FIG. 3, which allows only a person right in front of the image forming apparatus 1 to recognize the information contained in the operation screen of the display unit 471.

With the image forming apparatus 1, however, the operation screen displayed by the display unit 471 can be formed in the air as visible image, and therefore the information contained in the operation screen can also be transmitted to persons located distant from the image forming apparatus 1.

Back to FIG. 1 and FIG. 2, the operation detection unit 54 is configured to detect a pseudo-touch operation (operation of the user) simulating an action of the user of placing his/her hand in the display position of the visible image, when the visible image forming unit 50 forms the visible image. The operation detection unit 54 outputs a notice to the effect that the pseudo-touch operation has been detected, and the position information of the pseudo-touch operation, to the instruction reception unit 104.

For example, the operation detection unit 54 includes, though not shown, an imaging unit including an imaging lens that forms an image from light from a subject, an image sensor that performs photoelectric conversion of the subject image formed by the imaging lens, and a circuit that drives the image sensor. The operation detection unit 54 is located in the vicinity of the laser source unit 51, and shoots an image, within a specified area of a three-dimensional space from a predetermined position where the visible image is formed by the laser beam emitted from the laser source unit 51.

The operation detection unit 54 identifies an image such as the user's hand and the spatial position of the image, on the basis of the image that has been shot. Then the operation detection unit 54 detects, when the spatial position of the image such as the user's hand is within the specified area (for example, within 10 mm in at least one of x, y, and z directions) from the operation screen formed as visible image in the predetermined forming position, that the pseudo-touch operation is being performed with respect to the operation screen formed as visible image, and acquires the position information indicating the position where the pseudo-touch operation is performed.

The operation detection unit 54 processes the image that has been shot, for example image thresholding and pattern matching based on shading information, to thereby identify the image such as the user's hand. In this embodiment, the operation detection unit 54 decides whether the image that has been shot contains the image of the user's hand, through pattern matching between the shot image and a reference image of the user's hand stored in advance in the HDD 92.

Upon identifying the image of the hand, the operation detection unit 54 detects the position of the image as coordinate position on a predetermined three-dimensional coordinate. Then the operation detection unit 54 decides whether any part of the image of the hand overlaps with any part of a predetermined spatial position where the operation screen is formed as visible image. In the case where the image of the hand overlaps with the predetermined spatial position of the operation screen, the operation detection unit 54 detects that the pseudo-touch operation is being performed with respect to the operation screen.

The instruction reception unit 104 receives the operation of the user detected by the operation detection unit 54 as described above. Upon receipt of the notice to the effect that the pseudo-touch operation has been detected and the position information of the pseudo-touch operation from the operation detection unit 54, the instruction reception unit 104 receives a selection instruction with respect to the GUI of the operation screen formed at the position indicated by the position information.

When the user moves the hand at the position where the operation screen is formed, the operation detection unit 54 successively outputs the position information, from the initial position where the pseudo-touch operation was first detected to a final position where the pseudo-touch operation has been detected last. When the operation detection unit 54 outputs the successive position information, the instruction reception unit 104 receives a scroll instruction with respect to the operation screen.

Further, the operation detection unit 54 decides whether the shape of the hand used for the pseudo-touch operation is a predetermined shape. Here, the predetermined refers to, for example, a peace sign (erecting two of the five fingers, also called V sign, scissors sign, or crab claw sign). The operation detection unit 54 decides whether the shape of the hand used for the pseudo-touch operation is the peace sign shape, through pattern matching between the shot image and a reference image of the peace sign stored in advance in the HDD 92. Upon deciding that the shape of the hand used for the pseudo-touch operation is the peace sign shape, the operation detection unit 54 outputs a notice to such effect to the instruction reception unit 104.

When the operation detection unit 54 outputs the notice to the effect that the shape of the hand used for the pseudo-touch operation is the peace sign shape, in addition to the successive position information, the instruction reception unit 104 receives an elimination instruction with respect to the preview of the image to be formed contained in the operation screen. The elimination instruction refers to an instruction to eliminate a part of the preview of the image to be formed corresponding to an area designated by the instruction, the detail of which will be subsequently described. When the instruction reception unit 104 receives the elimination instruction, the controller 100 causes the image forming unit 12 to form an image by eliminating the part of the preview of the image to be formed corresponding to the area designated by the instruction.

Thus, the operation detection unit 54 acts, in collaboration with the instruction reception unit 104, as reception unit that receives the operation of the user performed in the air with respect to the operation screen formed as visible image by the visible image forming unit 50.

Hereunder, a specific operation performed by the image forming apparatus 1 will be described. FIG. 4 is a flowchart showing the operation flow of the image forming apparatus 1.

When the instruction reception unit 104 receives an image forming job transmitted from, for example, the computer 200 in the local area (YES at step S10), the display control unit 101 causes the visible image forming unit 50 to form the visible image representing the operation screen in the predetermined spatial position above the image forming apparatus 1 (step S11).

Figure 5A:
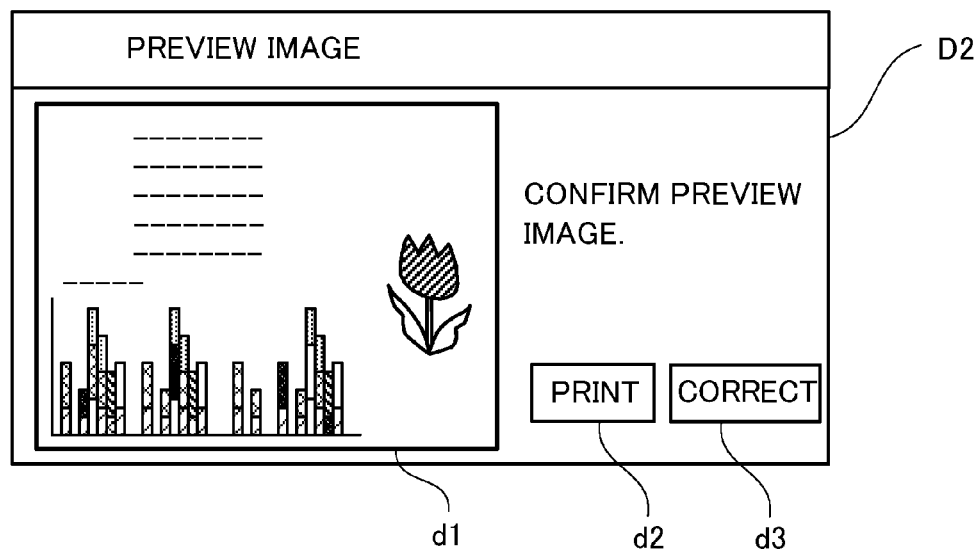
FIG. 5A is a front view of an operation screen formed as visible image by the visible image forming unit of the image forming apparatus according to the embodiment of the disclosure.

FIG. 5A illustrates an operation screen D2 formed as visible image by the visible image forming unit 50. The operation screen D2 includes a preview image region dl containing the preview of the image to be formed corresponding to the image forming job received by the instruction reception unit 104 at step S10, a print instruction button d2, and a correction instruction button d3.

In the case where the operation detection unit 54 outputs the notice to the effect that the pseudo-touch operation with respect to the operation screen has been detected after the visible image forming of step S11 (Yes at step S12), and the position information is not successively outputted from the operation detection unit 54 (NO at step S13), the instruction reception unit 104 receives the selection instruction with respect to the GUI of the operation screen formed at the position indicated by the position information outputted from the operation detection unit 54 (step S14).

The controller 100 and the display control unit 101 then execute the process associated with the GUI selected according to the selection instruction received at step S14 (step S15). Referring to the example shown in FIG. 5A, when the instruction reception unit 104 receives the selection instruction through the print instruction button d2, the controller 100 causes the image forming unit 12 to form the image displayed in the preview image region d1.

In contrast, in the case where the operation detection unit 54 outputs the notice to the effect that the pseudo-touch operation with respect to the operation screen has been detected after the visible image forming of step S11 (Yes at step S12), and the position information has been successively outputted from the operation detection unit 54 (YES at step S13), the instruction to be given to the instruction reception unit 104 differs depending on whether the shape of the hand used for the pseudo-touch operation is the peace sign shape.

Specifically, when the operation detection unit 54 outputs a notice to the effect that the shape of the hand used for the pseudo-touch operation is the peace sign shape (YES at step S16), the instruction reception unit 104 receives the elimination instruction with respect to the preview of the image to be formed displayed in the operation screen (step S17). In contrast, when the shape of the hand used for the pseudo-touch operation is not the peace sign shape (NO at step S16), the instruction reception unit 104 receives the scroll instruction with respect to the operation screen (step S21), and the display control unit 101 executes the scrolling (step S22). At step S22, the display control unit 101 causes the visible image forming unit 50 to form the visible image representing the operation screen that appears after the scrolling.

Figure 5B:
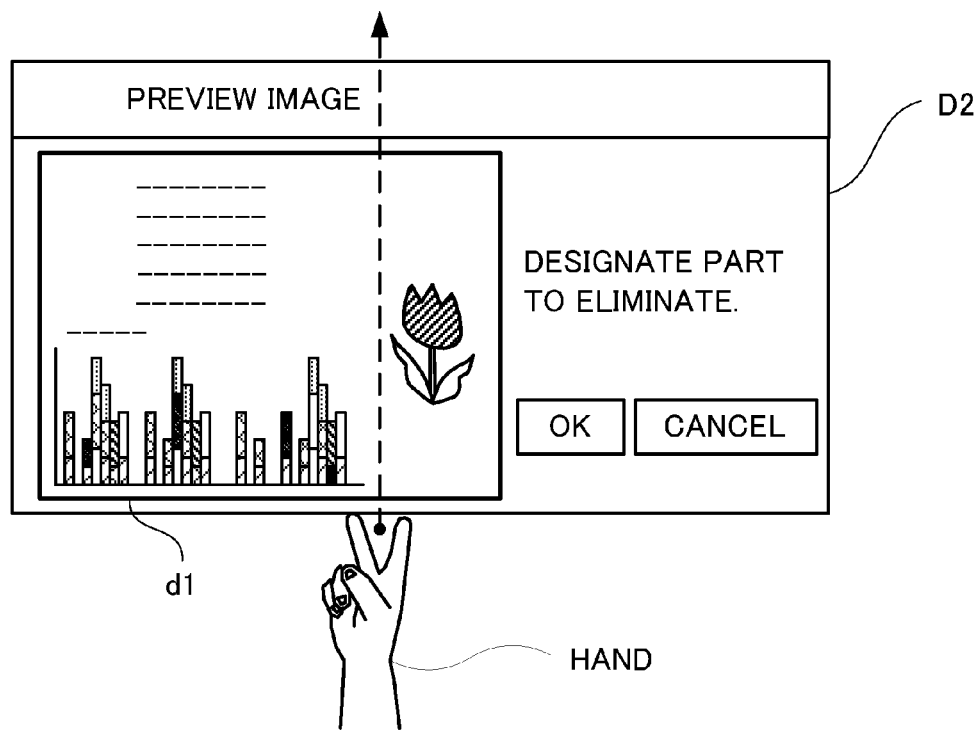
FIG. 5B is a front view of the operation screen for explaining an elimination instruction inputted by the user.

FIG. 5B illustrates an example of the elimination instruction inputted by the user. The user confirms the preview of the image to be formed visibly displayed in the air, and in the case where the user wishes to eliminate a part of the preview of the image to be formed the user makes an action of moving the peace sign-shaped hand so as to trace the preview displayed in the air (exemplifying the predetermined operation in the disclosure). In the example shown in FIG. 5B, the peace sign-shaped hand is moved so as to trace the position in the air corresponding to the preview image region dl from the bottom to the top, as indicated by a dot line arrow in FIG. 5B.

Following step S17, the display control unit 101 identifies the image in the area designated by the elimination instruction (step S18). More specifically, when the preview of the image to be formed displayed in the operation screen is divided into two parts by the locus of the peace sign-shaped hand, the display control unit 101 identifies, out of the two divided parts, the part on the side of the back of the hand used for the elimination instruction, as area designated by the elimination instruction. In the example shown in FIG. 5B, the region on the right including an image of a flower is on the side of the back of the hand used for the elimination instruction, hence the area designated by the elimination instruction.

The direction of the back of the hand is identified by the operation detection unit 54. To be more detailed, the operation detection unit 54 identifies the direction of the back of the hand used for the elimination instruction through pattern matching between the shot image and a reference image representing the back of the hand stored in advance in the HDD 92.

Then the display control unit 101 executes an elimination process which eliminates the image in the area identified at step S18, from the preview of the image to be formed (step S19). For example, the display control unit 101 may substitute the image in the area identified at step S18 with a blank image, thereby eliminating the image in the designated area from the preview of the image to be formed.

Following step S19, the display control unit 101 causes the visible image forming unit 50 to update the operation screen formed as visible image (step S20). At this step, the display control unit 101 causes the visible image forming unit 50 to form a visible image representing an operation screen containing an image formed by eliminating the image in the area identified at step S18 from the preview of the image to be formed.

Figure 6A:
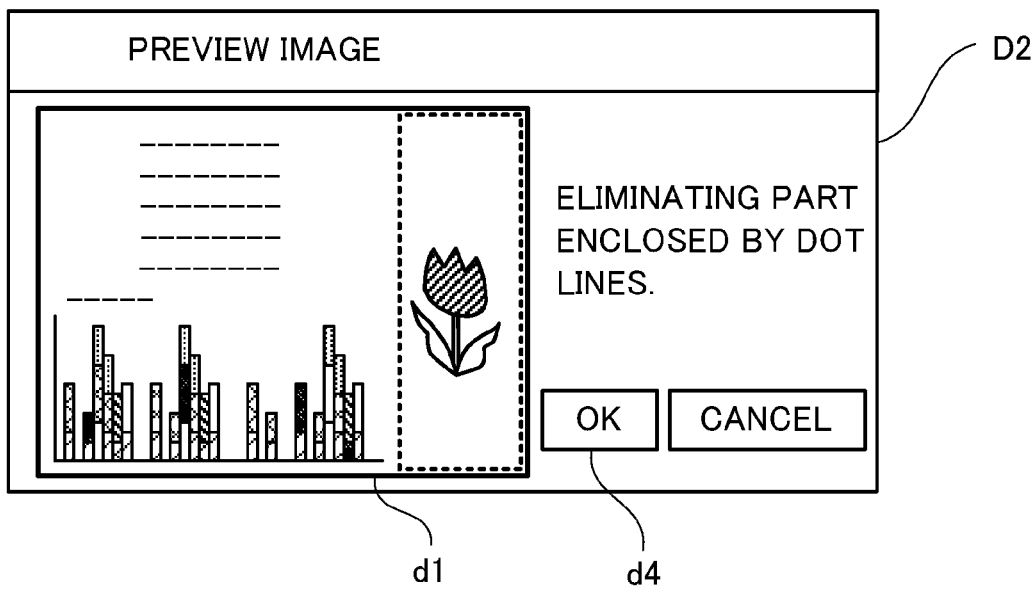
FIG. 6A is a front view of the operation screen showing an area designated by the elimination instruction of FIG. 5B.
Figure 6B:
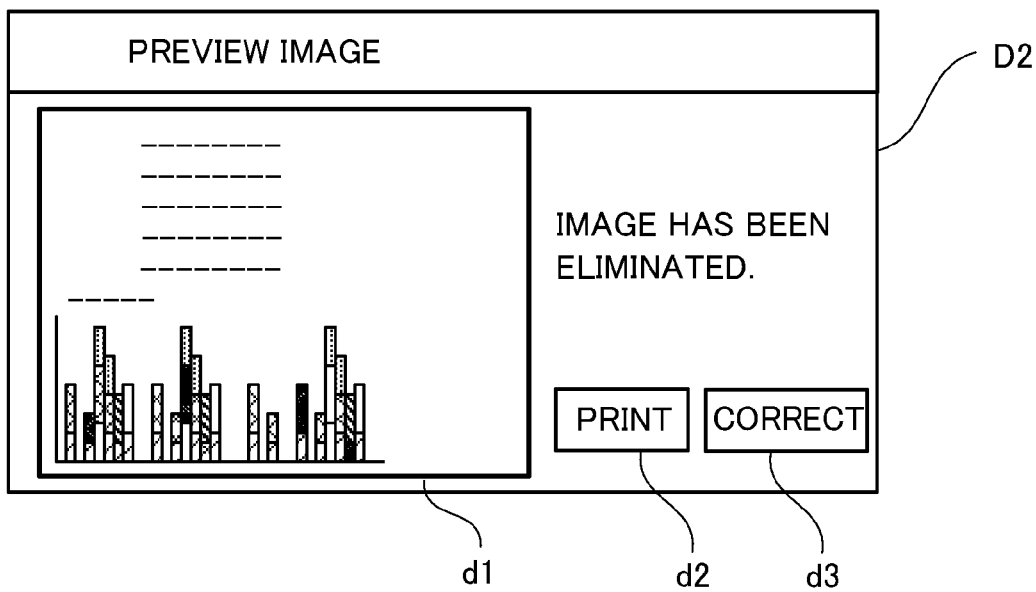
FIG. 6B is a front view of another operation screen formed as visible image by the visible image forming unit of the image forming apparatus according to the embodiment of the disclosure.

FIG. 6A illustrates the area designated by the elimination instruction of FIG. 5B. When the instruction reception unit 104 receives the selection instruction through an OK button d4 in the operation screen D2 shown in FIG. 6A, the display control unit 101 performs the operations of step S19 and step S20. In other words, the display control unit 101 generates the operation screen D2 shown in FIG. 6B, and also causes the visible image forming unit 50 to generate a visible image representing the operation screen D2 shown in FIG. 6B. In the operation screen D2 shown in FIG. 6B, the image in which the area enclosed by the dot lines in the operation screen D2 shown in FIG. 6A (area containing the image of the flower) has been substituted with the blank image is displayed in the preview image region d1.

In the case where the instruction reception unit 104 receives an image forming instruction after one of step S15, step S20, and step S22 (YES at step S23), the controller 100 causes the image forming unit 12 to form the image based on the preview of the image to be formed obtained as result of the corresponding step (step S24).

In recent years, visible image forming apparatuses that form a visible image in the air to thereby display required information have been proposed. For example, a visible image forming apparatus has been proposed that intermittently emits an invisible laser beam, and generates plasma by collecting the laser beam with lenses and mirrors, to thereby form, in the air, the visible image representing characters and pictures on the basis of the visible light from the plasma thus generated. In addition, a visible image forming apparatus has also been proposed that forms a visible image in the space of an automobile to thereby display required information.

Further, a visible image forming apparatus has been proposed that receives and reflects light from an object or a display device and converges the reflected light at a symmetrical position of the object or the display device with respect to an optical image forming device, to thereby form an object image in the air.

One of such visible image forming apparatuses may be incorporated in an image forming apparatus instead of or in addition to the conventional display devices such as an LCD or OLED display. In this case, a visible image representing a preview screen can be formed in the air.

However, simply forming the visible image representing the preview screen in the air only allows the user to confirm the preview of the image to be formed in the air, and hence the user is unable, for example, to edit the preview of the image to be formed that has been confirmed. The system that does not allow the user to edit the preview of the image to be formed, even when the image is not satisfactory to the user, lacks in user-friendliness.

In contrast, the configuration according to this embodiment enables the user not only to check the preview of the image to be formed in the air, but also to edit the preview of the image to be formed checked by the user.

As a matter of course, the disclosure may be modified in various manners without limitation to the foregoing embodiment.

For example, although the operation detection unit 54 is configured to identify the peace sign as predetermined shape in the foregoing embodiment, the disclosure is not limited to such an arrangement. The operation detection unit 54 may identify a different shape of the hand, instead of the peace sign, as predetermined shape. For example, the operation detection unit 54 may identify a hand with only one finger erected as predetermined shape.

In the foregoing embodiment, the display control unit 101 is configured to identify, as area designated by the elimination instruction, the part on the side of the back of the peace sign-shaped hand used for the elimination instruction, out of the two parts divided by the locus of the hand. However, the disclosure is not limited to such an arrangement. The display control unit 101 may identify the part on the side of the palm of the hand used for the elimination instruction, as area designated by the elimination instruction. Thus, the operation detection unit 54 is configured to decide, on the basis of the shape of the hand identified as above, as far as which side of the hand is the palm or the back of hand. In other words, the operation detection unit 54 decides as far as which side of the peace sign-shaped hand identified as above is the palm or the back of hand. Then the display control unit 101 identifies one of the two parts divided by the locus of the peace sign-shaped hand, as area designated by the elimination instruction.

In the foregoing embodiment, further, the operation of the display control unit 101 of eliminating the area designated by the elimination instruction from the preview of the image to be formed is triggered by the selection instruction inputted through the OK button d4 provided in the operation screen D2. However, the disclosure is not limited to such an arrangement. The operation of selecting the image corresponding to the area designated by the elimination instruction by the pseudo-touch operation may be employed as trigger of the eliminating operation.

In the case where a plurality of areas are designated by the elimination instruction, the display control unit 101 may eliminate only the area selected through the pseudo-touch operation from the preview of the image to be formed. More specifically, in the case where the operation detection unit 54 detects that the hand used for the pseudo-touch operation has the peace sign shape a plurality of times, and the notice to this effect is outputted the plurality of times, the instruction reception unit 104 receives the plurality of elimination instructions. When the instruction reception unit 104 thus receives the plurality of elimination instructions, the instruction reception unit 104 receives the selection instruction for selecting one area out of the areas respectively designated by the plurality of elimination instructions, upon deciding that the operation detection unit 54 has detected that the pseudo-touch operation (example of an second predetermined operation of the user) has been performed on the visible image corresponding to the area. In other words, the instruction reception unit 104 receives the selection instruction for selecting the area where the pseudo-touch operation has been performed. Only such area selected through the selection instruction received by the instruction reception unit 104 is regarded as object of the elimination process by the display control unit 101.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   an image forming unit configured to form an image on a recording sheet;
   an image formation control unit configured to control an operation of the image forming unit;
   a visible image forming unit configured to form a visible image in air;
   a display control unit configured to control an operation of the visible image forming unit, so as to cause the visible image forming unit to form a visible image representing a display screen containing a preview of an image to be formed; and
   a reception unit configured to receive an operation of a user performed in the air with respect to the display screen formed as visible image by the visible image forming unit,
   wherein the display control unit configured to execute an elimination process which eliminates an image in an area designated by the predetermined operation of the user from the preview of the image to be formed when the reception unit receives a predetermined operation of the user, and
   the image formation control unit is configured to cause the image forming unit to form an image which has been subjected to the elimination process by the display control unit.

2. The image forming apparatus according to claim 1, wherein the reception unit decides whether a shape of a hand used for the operation of the user in the air is a predetermined shape, and receives, as the predetermined operation of the user, an operation of moving the hand of the predetermined shape at a position where the visible image is formed.

3. The image forming apparatus according to claim 2, wherein, when the preview of the image to be formed is divided into two parts by a locus of the hand formed by the predetermined operation of the user, the reception unit recognizes one of the two divided parts as area designated by the predetermined operation of the user, and
   the display control unit eliminates an image in the one part with the elimination process, from the preview of the image to be formed.

4. The image forming apparatus according to claim 3,
wherein the reception unit decides, on a basis of the decided shape of the hand, as far as which side of the hand is a palm or back of hand, and recognizes one part out of the two divided parts on a side of one of the palm and the back of hand as area designated by the predetermined operation of the user.

5. The image forming apparatus according to claim 2,
wherein the reception unit recognizes the operation of moving the hand at the position where the visible image is formed, as scrolling operation with respect to the display screen, when the shape of the hand used for the operation of the user in the air is not the predetermined shape.

6. The image forming apparatus according to claim 1,
wherein, when the reception unit receives a plurality of the predetermined operations of the user, the reception unit receives a selection instruction for selecting one area out of the areas respectively designated by the predetermined operations of the user, upon deciding that a second predetermined operation of the user has been performed with respect to the one area, on a basis of the operation in the air with respect to the display screen, and
the display control unit subjects only the area selected by the selection instruction received by the reception unit to the elimination process.

7. The image forming apparatus according to claim 1,
wherein the display control unit eliminates, with the elimination process, the image in the area designated by the predetermined operation of the user from the preview of the image to be formed, by substituting the image in the area designated by the predetermined operation of the user with a blank image.

8. The image forming apparatus according to claim 1,
wherein the display control unit causes the visible image forming unit, when the reception unit receives the predetermined operation of the user, to update the display screen formed as visible image to a display screen containing an image formed by eliminating, with the elimination process, the image in the area designated by the predetermined operation of the user from the preview of the image to be formed.

* * * * *